(12) United States Patent
Takaiwa et al.

(10) Patent No.: US 10,316,159 B2
(45) Date of Patent: Jun. 11, 2019

(54) EPOXY RESIN COMPOSITION, PREPREG, AND FIBER REINFORCED MATERIAL

(71) Applicant: TORAY INDUSTRIES, INC., Tokyo (JP)

(72) Inventors: Reo Takaiwa, Ehime (JP); Junko Kawasaki, Ehime (JP); Kentaro Sano, Ehime (JP); Noriyuki Hirano, Ehime (JP)

(73) Assignee: TORAY INDUSTRIES, INC., Tokyo (JP)

( * ) Notice: Subject to any disclaimer, the term of this patent is extended or adjusted under 35 U.S.C. 154(b) by 0 days.

(21) Appl. No.: 15/760,485

(22) PCT Filed: Jul. 20, 2016

(86) PCT No.: PCT/JP2016/071321
§ 371 (c)(1),
(2) Date: Mar. 15, 2018

(87) PCT Pub. No.: WO2017/047225
PCT Pub. Date: Mar. 23, 2017

(65) Prior Publication Data
US 2018/0251617 A1   Sep. 6, 2018

(30) Foreign Application Priority Data

Sep. 17, 2015 (JP) ................. 2015-183675

(51) Int. Cl.
| | |
|---|---|
| B32B 27/38 | (2006.01) |
| B32B 27/26 | (2006.01) |
| B32B 27/04 | (2006.01) |
| C08J 5/24 | (2006.01) |
| C08L 63/00 | (2006.01) |
| C08L 63/06 | (2006.01) |
| C08G 59/50 | (2006.01) |
| C08G 59/56 | (2006.01) |
| C08G 59/32 | (2006.01) |
| C08G 59/40 | (2006.01) |
| C08G 59/60 | (2006.01) |
| B32B 5/24 | (2006.01) |
| C08K 5/21 | (2006.01) |
| C08K 5/31 | (2006.01) |
| C08K 5/41 | (2006.01) |
| C08L 81/06 | (2006.01) |

(52) U.S. Cl.
CPC ........ *C08J 5/24* (2013.01); *B32B 5/24* (2013.01); *B32B 27/38* (2013.01); *C08G 59/3227* (2013.01); *C08G 59/3245* (2013.01); *C08G 59/4021* (2013.01); *C08G 59/50* (2013.01); *C08G 59/5033* (2013.01); *C08G 59/60* (2013.01); *C08K 5/21* (2013.01); *C08K 5/31* (2013.01); *C08K 5/41* (2013.01); *C08L 63/00* (2013.01); *C08L 63/06* (2013.01); *C08L 81/06* (2013.01); *B32B 2260/021* (2013.01); *B32B 2260/046* (2013.01); *B32B 2262/106* (2013.01); *C08J 2363/00* (2013.01); *C08L 2205/02* (2013.01)

(58) Field of Classification Search
None
See application file for complete search history.

(56) References Cited

U.S. PATENT DOCUMENTS

| | | | |
|---|---|---|---|
| 8,263,216 B2 | 9/2012 | Arai et al. | |
| 8,309,631 B2 | 11/2012 | Tomioka et al. | |
| 9,738,782 B2 | 8/2017 | Hayashi et al. | |
| 9,957,387 B2 | 5/2018 | Arai et al. | |
| 2011/0009528 A1 | 1/2011 | Tomioka et al. | |
| 2013/0217283 A1* | 8/2013 | Arai | C08G 59/28 442/59 |

FOREIGN PATENT DOCUMENTS

| | | | | |
|---|---|---|---|---|
| CN | 101945916 A | | 1/2011 | |
| CN | 102348735 A | | 2/2012 | |
| JP | 56062153 A | * | 5/1981 | ............ B32B 27/38 |
| JP | 57051772 A | * | 3/1982 | ............ C08J 3/16 |
| JP | 08311162 A | * | 11/1996 | ............ C08G 59/32 |
| JP | 2000017090 A | | 1/2000 | |
| JP | 2005281488 A | * | 10/2005 | ............ C08G 59/20 |
| JP | 2006104403 A | | 4/2006 | |
| JP | 2010053278 A | | 3/2010 | |
| JP | 2011184616 A | | 9/2011 | |
| JP | 2014145018 A | | 8/2014 | |
| JP | 2014156582 A | | 8/2014 | |

(Continued)

OTHER PUBLICATIONS

Machine translation of JP-08311162-A (no date).*
Translation of JP-56062153-A (no date).*
Machine translation of JP-2005281488-A (no date).*
Machine translation of JP-57051772-A (no date).*
International Search Report and Written Opinion for International Application No. PCT/JP2016/071321, dated Sep. 6, 2016, 4 pages.
Extended European Search Report for European Application No. 16 84 6098.8, dated Jul. 18, 2018, 5 pages.

(Continued)

*Primary Examiner* — Michael J Feely
(74) *Attorney, Agent, or Firm* — RatnerPrestia

(57) ABSTRACT

An epoxy resin composition includes: an [A] epoxy resin at least comprising an [A1] isocyanurate epoxy resin and an [A2] glycidyl amine epoxy resin; [B] dicyandiamide; and [C] diaminodiphenyl sulfone, wherein (1) an average epoxy equivalent of the [A] epoxy resin is 115 g/eq to 150 g/eq, and (2) an amount of the component [C] added is an amount of 0.05 equivalent to 0.3 equivalent relative to epoxy groups in the [A] epoxy resin in terms of active hydrogen groups.

14 Claims, No Drawings

(56) References Cited

FOREIGN PATENT DOCUMENTS

| KR | 20130108351 A | 10/2013 |
| KR | 20130141491 A | 12/2013 |
| WO | 2009107697 A | 9/2009 |

OTHER PUBLICATIONS

Korean Grant of Patent for Korean Application No. 10-2018-7006281, dated Jun. 1, 2018, with translation, 3 pages.
Chinese Office Action for Chinese Application No. 201680054071.7, dated Jul. 23, 2018 with partial translation, 6 pages.

* cited by examiner

EPOXY RESIN COMPOSITION, PREPREG, AND FIBER REINFORCED MATERIAL

CROSS REFERENCE TO RELATED APPLICATIONS

This is the U.S. National Phase application of PCT/JP2016/071321, filed Jul. 20, 2016, which claims priority to Japanese Patent Application No. 2015-183675, filed Sep. 17, 2015, the disclosures of these applications being incorporated herein by reference in their entireties for all purposes.

TECHNICAL FIELD OF THE INVENTION

The present invention relates to an epoxy resin composition preferably used for a matrix resin in a fiber reinforced material suitable for sports applications and general industrial applications, and a prepreg and a fiber reinforced material using the epoxy resin composition as a matrix resin.

BACKGROUND OF THE INVENTION

A fiber reinforced material using carbon fibers, aramid fibers, or the like as reinforcement fibers is widely used for structural materials used in aircrafts and automobiles and sport and general industrial applications such as tennis rackets, golf shafts, fishing rods, bicycles, and chassis utilizing its high specific strength and specific elastic modulus. As a method for producing a fiber reinforced material, a method of laying-up a plurality of prepregs, which are a sheet-like molding material formed by impregnating an uncured matrix resin in reinforcement fibers, and thereafter heating to cure the laid-up prepregs and a resin transfer molding method in which a liquid resin is poured into reinforcement fibers disposed in a mold and heating to cure the poured resin are used. Of these methods, the method of using prepregs has an advantage in that a high performance fiber reinforced material is easily obtained due to accurate control of the orientation of the reinforcement fibers and a high degree of freedom of design of laminate structures. As the matrix resin used for the prepreg, thermosetting resins are mainly used from the viewpoint of heat resistance and productivity. Of these thermosetting resins, epoxy resins are preferably used from the viewpoint of mechanical characteristics such as adhesion of the matrix resin to the reinforcement fibers. In recent years, the fiber reinforced materials have been required to improve various physical properties in order to meet the requirements of golf shafts, fishing rods, bicycles, automobile parts, industrial parts, and the like, which are required to have further reduced weights. In applications such as bicycle rims, automobile parts, industrial parts, and the like, for example, further improvement in heat resistance is required.

As the matrix resin used in the fiber reinforced material having excellent heat resistance, Patent Literature 1 describes an epoxy resin composition that can provide a fiber reinforced material having excellent elastic modulus and elongation as well as excellent heat resistance.

In addition, Patent Literature 2 describes an epoxy resin composition that can provide a cured epoxy resin having excellent heat resistance, elongation, and curability.

Furthermore, Patent Literature 3 describes a fiber reinforced material having excellent heat resistance, environmental resistance, and durability and high compression strength.

PATENT LITERATURE

Patent Literature 1: Japanese Patent Application Laid-open No. 2010-053278

Patent Literature 2: Japanese Patent Application Laid-open No. 2014-145018

Patent Literature 3: Japanese Patent Application Laid-open No. 2000-017090

SUMMARY OF THE INVENTION

In recent years, with the expansion of the applications of fiber reinforced materials, the requirement for further improvement of the heat resistance of the fiber reinforced materials has been increasing more and more and matrix resins to be used also have been required to have sufficient mechanical properties of material at high temperature.

However, the epoxy resins described in Patent Literature 1 and Patent Literature 2 with low glass transition temperatures have not satisfied the mechanical properties of material at high temperature, which have been required in recent years. The fiber reinforced material described in Patent Literature 3 exhibits a high glass transition temperature, but has insufficient mechanical properties of material at high temperature.

As described above, epoxy resin compositions having a high glass transition temperature and excellent mechanical properties of material at high temperature have not been disclosed in known techniques, and thus the demand for improvement in heat resistance and mechanical properties of material at high temperature of the fiber reinforced material has not been satisfied.

An object of the present invention is to provide an epoxy resin composition that can overcome such disadvantages in the conventional technique and that is used for the material of a fiber reinforced material having excellent heat resistance and mechanical properties of material at high temperature and a prepreg and a fiber reinforced material using the epoxy resin composition.

Solution to Problem

As a result of extensive study to solve the above-described problem, the present inventors completed the present invention. That is, an epoxy resin composition according to the present invention includes: an [A] epoxy resin at least comprising an [A1] isocyanurate epoxy resin and an [A2] glycidyl amine epoxy resin; [B] dicyandiamide; and [C] diaminodiphenyl sulfone, wherein (1) an average epoxy equivalent of the [A] epoxy resin is 115 g/eq to 150 g/eq, and (2) an amount of the component [C] added is an amount of 0.05 equivalent to 0.3 equivalent relative to epoxy groups in the [A] epoxy resin in terms of active hydrogen groups.

Moreover, a prepreg according to the present invention is formed by impregnating the epoxy resin composition into reinforcement fibers.

Moreover, a fiber reinforced material according to the present invention is formed by curing the prepreg.

According to the present invention, the epoxy resin composition that is used for the material of a fiber reinforced material having excellent heat resistance and mechanical properties of material at high temperature can be provided. The prepreg made of the epoxy resin composition according to the present invention and reinforcement fibers can provide a fiber reinforced material having excellent mechanical properties of material even at high temperature.

DETAILED DESCRIPTION OF EMBODIMENTS OF THE INVENTION

The epoxy resin composition according to embodiments of the present invention includes an [A] epoxy resin including at least an [A1] isocyanurate epoxy resin and an [A2] glycidyl amine epoxy resin, [B] dicyandiamide, and [C] diaminodiphenyl sulfone as essential components.

(Component [A1])

The component [A1] in embodiments of the present invention is an isocyanurate epoxy resin having isocyanurate groups in the molecule of the epoxy resin.

As the isocyanurate epoxy resin, "TEPIC (registered trademark)"-S, -G, and -VL (all products are manufactured by Nissan Chemical Industries, Ltd.), "Araldite (registered trademark)" PT9810 (manufactured by Huntsman Advanced Materials GmbH), and the like can be used.

The epoxy resin composition of the present invention preferably includes 20 parts by mass to 40 parts by mass of the component [A1] in 100 parts by mass of the [A] epoxy resin. The cured epoxy resin having high mechanical properties of material at high temperature, in particular high elastic modulus, is obtained when the epoxy resin composition satisfies the above range.

(Component [A2])

The component [A2] in embodiments of the present invention is a glycidyl amine epoxy resin.

As the glycidyl amine epoxy resin, a diaminodiphenyl-methane epoxy resin, an aminophenol epoxy resin, a diaminodiphenyl sulfone epoxy resin, and the like are suitably used.

As the diaminodiphenylmethane epoxy resin, "SUMI-EPDXY (registered trademark)" ELM434 (manufactured by Sumitomo Chemical Company, Limited), YH434L (manufactured by NIPPON STEEL & SUMIKIN CHEMICAL CO., LTD.), "jER (registered trademark)" 604 (manufactured by Mitsubishi Chemical Corporation), Araldite (registered trademark)" MY720 and MY721 (manufactured by Huntsman Advanced Materials GmbH), and the like can be used. As the aminophenol epoxy resin, "SUMI-EPDXY (registered trademark)" ELM100 and ELM120 (manufactured by Sumitomo Chemical Company, Limited), Araldite (registered trademark)" MY0500, MY0510, and MY0600 (manufactured by Huntsman Advanced Materials GmbH), and the like can be used. As the diaminodiphenyl sulfone epoxy resin, TG3DAS (manufactured by Mitsui Fine Chemicals, Inc.) and the like can be used.

From the viewpoint of obtaining the cured epoxy resin having a high glass transition temperature, the average number of functional groups of the epoxy group of the component [A2] is preferably 3 or more.

The epoxy resin composition of the present invention preferably includes 10 parts by mass to 50 parts by mass of the component [A2] in 100 parts by mass of the [A] epoxy resin and more preferably includes 20 parts by mass to 40 parts by mass of the component [A2] in 100 parts by mass of the [A] epoxy resin. The cured epoxy resin having a high glass transition temperature is obtained, when the epoxy resin composition satisfies the above range.

In embodiments of the present invention, combined use of the component [A1] and the component [A2] is essential as the [A] epoxy resin. By the combined use of these components, the epoxy resin composition exhibits particularly high preservation stability when the [A] epoxy resin is used in combination with the component [B] and the component [C].

Furthermore, in the epoxy resin composition of the present invention, the total parts by mass of the component [A1] and the component [A2] is preferably 40 parts by mass to 90 parts by mass. The cured epoxy resin having a high glass transition temperature and balanced mechanical properties of material at high temperature can be obtained when the epoxy resin composition satisfies the above range.

(Component [A3])

In the epoxy resin composition of the present invention, the [A] epoxy resin preferably includes an [A3] bisphenol epoxy resin. A preferable amount of such a bisphenol epoxy resin to be added is 20 parts by mass to 60 parts by mass in 100 parts by mass of the [A] epoxy resin. The cured epoxy resin exhibiting high mechanical strength is likely to be obtained, when the epoxy resin composition satisfies this range.

As the bisphenol epoxy resins, a bisphenol A epoxy resin, a bisphenol F epoxy resin, a bisphenol AD epoxy resin, and the like are preferably used. Of these bisphenol epoxy resins, the bisphenol F epoxy resin is preferable from the viewpoint of obtaining a cured resin having excellent elastic modulus at high temperature.

As the bisphenol F epoxy resin, "jER (registered trademark)" 806 and 807 (manufactured by Mitsubishi Chemical Corporation), "EPICLON (registered trademark)" Epc830 (manufactured by Dainippon Ink and Chemicals, Inc.), and the like can be used.

(Addition of Other Epoxy Resin Components)

In addition to the component [A1] and the component [A2], epoxy resins other than [A3] can be added to the [A] epoxy resin, as long as the effect of the present invention is not impaired. Not only one epoxy resin but also a plurality of epoxy resins listed above can be used. Specific examples of these epoxy resins include a phenol novolac epoxy resin, a cresol novolac epoxy resin, an aliphatic epoxy resin having bi-functionality or less functionality, a bisnaphtalene epoxy resin, a biphenyl epoxy resin, a phenolaralkyl epoxy resin, a biphenylaralkyl epoxy resin, a naphtalenearalkyl epoxy resin, a dicyclopentadiene epoxy resin, a urethane modified epoxy resin, a tetraphenylethane epoxy resin, a triphenylethane epoxy resin, and a fluorene epoxy resin.

(Average Epoxy Equivalent of [A] Epoxy Resin)

The average epoxy equivalent of the [A] epoxy resin in the epoxy resin composition of embodiments of the present invention is required to be in a range of 115 g/eq to 150 g/eq. The epoxy resin composition having the average epoxy equivalent less than 115 g/eq tends to cause uncontrollable reaction during curing of the [A] epoxy resin. This may often decrease the mechanical strength of the obtained cured product and thus the fiber reinforced material having stable quality cannot be obtained. The epoxy resin composition having the average epoxy equivalent more than 150 g/eq results in reduction in physical properties of the obtained cured product at high temperature.

The average epoxy equivalent of the [A] epoxy resin in the epoxy resin composition can be calculated in accordance with the following Formula (1), where n types of epoxy resins are used in combination, the total parts of mass of the [A] epoxy resin in the epoxy resin composition is G, and Wx parts by mass of an epoxy resin X having an epoxy equivalent of Ex (g/eq) is added (here, X=1, 2, 3, . . . , n).

$$\text{Average epoxy equivalent of [A] epoxy resin [g/pg]} = \frac{G}{\left\{\left(\frac{W_1}{E_1}\right) + \left(\frac{W_2}{E_2}\right) + \ldots + \left(\frac{W_x}{E_x}\right) \ldots + \left(\frac{W_n}{E_n}\right)\right\}} \quad (1)$$

(Component [B])

The component [B] in the present invention is dicyandiamide. Dicyandiamide has an advantage in that dicyandiamide provides the cured epoxy resin with high mechanical properties of material and heat resistance and is widely used as a hardener for various epoxy resins. Dicyandiamide also provides excellent preservation stability of the epoxy resin composition and thus is suitably used. Examples of the commercially available products of such dicyandiamide include DICY7 and DICY15 (both products are manufactured by Mitsubishi Chemical Corporation).

The total amount of dicyandiamide [B] is preferably in an amount of active hydrogen groups of 0.2 equivalent to 1.2 equivalents, more preferably in an amount of active hydrogen groups of 0.3 equivalent to 1.0 equivalent, and most preferably in an amount of active hydrogen groups of 0.4 equivalent to 0.7 equivalent relative to the epoxy groups of each of the epoxy resin components included in the [A] epoxy resin of the epoxy resin composition. By setting the amount of the active hydrogen in this range, the cured epoxy resin having excellent balance of heat resistance and mechanical properties of material can be obtained.

(Component [C])

The component [C] in embodiments of the present invention is diaminodiphenyl sulfone. By adding diaminodiphenyl sulfone, the cured epoxy resin having high heat resistance can be obtained.

The total amount of diaminodiphenyl sulfone [C] is required to be in an amount of active hydrogen groups of 0.05 equivalent to 0.3 equivalent, preferably in an amount of active hydrogen groups of 0.1 equivalent to 0.25 equivalent, and more preferably in an amount of active hydrogen groups of 0.1 equivalent to 0.2 equivalent relative to the epoxy groups of each of the epoxy resin components included in the [A] epoxy resin of the epoxy resin composition. Diaminodiphenyl sulfone having an equivalent of less than 0.05 results in lowering the glass transition temperature of the cured product, whereas diaminodiphenyl sulfone having an equivalent of more than 0.3 results in deterioration in the preservation stability of the epoxy resin composition.

(Component [D])

The epoxy resin composition in embodiments of the present invention preferably includes an accelerator as a component [D], from the viewpoint of controlling a curing rate. Examples of the accelerator [D] include a urea compound and an imidazole compound. The urea compound is particularly preferably used from the viewpoint of the preservation stability of the epoxy resin composition.

Examples of such a urea compound include 3-(3,4-dichlorophenyl)-1,1-dimethylurea, 3-(4-chlorophenyl)-1,1-dimethylurea, phenyldimethyl urea, and toluene bis(dimethylurea). As the commercially available product of aromatic urea compounds, DCMU99 (manufactured by Hodogaya Chemical Co., Ltd.) and "Omicure (registered trademark)" 24 (manufactured by PTI Japan Corporation) can be used.

(Component [E])

The component [E] in embodiments of the present invention is a thermoplastic resin. By adding the [E] thermoplastic resin to the epoxy resin composition, the viscoelasticity of the epoxy resin composition can be adjusted. This can improve tuck and draping properties when the [E] thermoplastic resin is used as a part of the matrix resin of a prepreg. As such an [E] thermoplastic resin, an [E1] thermoplastic resin having functional groups capable of forming hydrogen bond, which has high compatibility with the [A] epoxy resin and enables to improve adhesion between the [A] epoxy resin and reinforcement fibers, is preferably used.

Examples of the functional groups capable of forming hydrogen bond include an alcoholic hydroxy group, a carboxy acid group, an amide bond, and a sulfonyl group.

Examples of the thermoplastic resin having alcoholic hydroxy groups may include polyvinyl acetal resins such as polyvinyl formal; polyvinyl alcohol, and polyvinyl butyral. Examples of the thermoplastic resin having carboxylic acid groups may include polymethyl methacrylate. Examples of the thermoplastic resin having amide bonds may include polyamides, polyimides, and polyvinylpyrrolidone. Examples of the thermoplastic resin having sulfonyl groups may include polysulfones.

Of these thermoplastic resins, polysulfones and polyimides are preferable because the polysulfones and the polyimides have an effect of improving impact resistance of the fiber reinforced material without reducing heat resistance from the viewpoint that these resins themselves have excellent heat resistance and impact resistance. Polyethersulfone is particularly preferable.

Examples of the commercially available product of such [E] thermoplastic resins may include "Radel (registered trademark)" A (manufactured by Solvay Advanced Polymers, L. L. C) and "Sumika Excel (registered trademark)" PES (manufactured by Sumitomo Chemical Company, Limited) as polysulfones and "Ultem (registered trademark)" (manufactured by GE plastic Co., Ltd.) and "Matrimid (registered trademark)" 5218 (manufactured by Huntsman Advanced Materials GmbH) as polyamides.

(Method for Producing Epoxy Resin Composition)

As preparation of the epoxy resin composition of the present invention, for example, the epoxy resin composition may be kneaded using machines such as a kneader, a planetary mixer, a three-roll mixer, and a twin screw extruder or may be blended by hand using a beaker and a spatula if the epoxy resin composition can be uniformly kneaded by hand.

(Method for Preparing Cured Epoxy Resin)

In order to measure the flexural modulus of the cured epoxy resin of the present invention, cured epoxy resins were prepared by the following method for preparing the cured epoxy resins. An epoxy resin composition was filled into a mold whose thickness was set to 2 mm by using spacers. The filled epoxy resin composition was cured at a temperature of 180° C. for 120 minutes to give a cured epoxy resin having a thickness of 2 mm.

(Fiber Reinforced Material)

Subsequently, the fiber reinforced material will be described. The fiber reinforced material including the cured product of the epoxy resin composition of the present invention as a matrix resin can be obtained by combining and integrating the epoxy resin composition with reinforcement fibers and thereafter curing the integrated product by heating.

The reinforcement fibers used in the present invention are not particularly limited. Glass fibers, carbon fibers, aramid fibers, boron fibers, alumina fibers, silicon carbide fibers, and the like are used. These fibers may be used singly or in combination by mixing two or more types of fibers. Of these fibers, the carbon fibers are preferable from the viewpoint of obtaining the fiber reinforced material having light weight and high elasticity.

(Prepreg)

For obtaining the fiber reinforced material, prepregs are preferably formed of the epoxy resin composition and the reinforcement fibers in advance. The prepreg is in a material form that can precisely control the alignment of the reinforcement fibers and a ratio of the epoxy resin composition and maximize the characteristics of the fiber reinforced material. The prepreg can be obtained by impregnating the epoxy resin composition of the present invention into the reinforcement fibers. The method for impregnating the epoxy resin composition into the reinforcement fibers includes known methods such as a hot melt method (a dry method).

The hot melt method is a method in which the epoxy resin composition lowering its viscosity by heating is directly impregnated into the reinforcement fibers. Specifically, the hot melt method is a method in which films formed by applying the epoxy resin composition onto pieces of release paper or the like is previously prepared, subsequently the film is stacked on one side or both sides of a sheet formed by arranging the reinforcement fibers or woven reinforcement fibers (a reinforcement fiber cloth), and heat and pressure are applied to the epoxy resin composition to impregnating the epoxy resin composition into the reinforcement fibers.

(Method for Forming Prepreg)

In a prepreg lamination method, as a method for providing heat and pressure, a press forming method, an autoclave molding method, a bag molding method, a wrapping tape method, an internal pressure molding method, and the like can be adequately used.

The fiber reinforced material including the cured product of the epoxy resin composition of the present invention and the reinforcement fibers can be widely used for general industrial applications and sports applications. More specifically, the fiber reinforced material is suitably used for structural bodes for automobiles, ships, railway vehicles, and the like in the general industrial applications. The fiber reinforced material is suitably used for golf shafts, fishing rods, and racket applications for tennis and badminton in the sports applications. Of these applications, the fiber reinforced material is particularly suitably used for industrial material applications used in a high temperature environment from the viewpoint of making the most use of the characteristic that the fiber reinforced material having high elastic modulus and strength at high temperature can be obtained.

EXAMPLES

Hereinafter, the present invention will be described in more detail with reference to Examples. The present invention, however, is not limited to the description of these Examples.

Each physical property was measured under an environment at a temperature of 23° C. and a relative humidity of 50%, unless otherwise noted.

Materials used for preparing each epoxy resin composition are as follows:

<Materials Used>

[A1] Isocyanurate Epoxy Resins

"TEPIC (registered trademark)"-S (isocyanurate epoxy resin, epoxy equivalent: 100, manufactured by Nissan Chemical Industries, Ltd.)

"TEPIC (registered trademark)"-VL (isocyanurate epoxy resin, epoxy equivalent: 135, manufactured by Nissan Chemical Industries, Ltd.)

[A2] Glycidyl Amine Epoxy Resins

"Araldite (registered trademark)" MY0600 (aminophenol epoxy resin, epoxy equivalent: 118, manufactured by Huntsman Advanced Materials GmbH), "SUMI-EPDXY (registered trademark)" ELM434 (di-aminodiphenylmethane epoxy resin, epoxy equivalent: 120, manufactured by Sumitomo Chemical Company, Limited)

[A3] Bisphenol Epoxy Resins

"EPICLON (registered trademark)" Epc830 (bisphenol F epoxy resin, epoxy equivalent: 172, manufactured by Dainippon Ink and Chemicals, Inc.)

"jER (registered trademark)" 828 (bisphenol A epoxy resin, epoxy equivalent: 189, manufactured by Mitsubishi Chemical Corporation)

"jER (registered trademark)" 1001 (bisphenol A epoxy resin, epoxy equivalent: 475, manufactured by Mitsubishi Chemical Corporation)

Other Epoxy Resins

"jER (registered trademark)" 154 (phenol novolac epoxy resin, epoxy equivalent: 175, manufactured by Mitsubishi Chemical Corporation)

"EPICLON (registered trademark)" HP-4700 (bisnaphtalene epoxy resin, epoxy equivalent: 164, manufactured by Dainippon Ink and Chemicals, Inc.)

"jER (registered trademark)" YX-4000 (biphenyl epoxy resin, epoxy equivalent: 192, manufactured by Mitsubishi Chemical Corporation)

[B] Dicyandiamide

DICY7 (dicyandiamide, manufactured by Mitsubishi Chemical Corporation)

[C] Diaminodiphenyl Sulfone

SEIKACURE-S (4,4'-diaminodiphenyl sulfone, manufactured by Wakayama Seika Kogyo Co., Ltd.) 3,3'-DAS (3,3'-diaminodiphenyl sulfone, manufactured by Mitsui Fine Chemicals, Inc.)

[D] Accelerator

DCMU99 (3-(3,4-dichlorophenyl)-1,1-dimethylurea, manufactured by Hodogaya Chemical Co., Ltd.)

[E] Thermoplastic Resin

"Sumika Excel (registered trademark)" PES 5003P (polyethersulfone, manufactured by Sumitomo Chemical Company, Limited)

"Vinylec (registered trademark)" K (polyvinyl formal, manufactured by JNC CORPORATION)

<Method for Preparing Epoxy Resin Composition>

The predetermined amounts of the [A] epoxy resin and the [E] thermoplastic resin were charged into a kneader and the temperature of the resultant mixture was raised to 150° C. while the resultant mixture was being kneaded to give a clear viscous liquid. The viscous liquid was cooled to 60° C. while being kneaded and thereafter [B] dicyandiamide, [C] diaminodiphenyl sulfone, and a [D] accelerator were added. The resultant mixture was kneaded at 60° C. for 30 minutes to give an epoxy resin composition.

The compositions of each of the epoxy resin compositions in Examples and Comparative Examples are listed in Tables 1 to 3.

<[A] Average Epoxy Equivalent of Epoxy Resin>

The average epoxy equivalent of each of the epoxy resin components included in the [A] epoxy resin in the epoxy resin composition was calculated in accordance with the following Formula (1), where n types of epoxy resins were used in combination, the total parts of mass of the [A] epoxy resin in the epoxy resin composition was G, and Wx parts by mass of an epoxy resin X having an epoxy equivalent of Ex (g/eq) was added (here, X=1, 2, 3, . . . , n).

$$\text{Average epoxy equivalent of [A] epoxy resin [g/pg]} = \frac{G}{\left\{\left(\frac{W_1}{E_1}\right)+\left(\frac{W_2}{E_2}\right)+\ldots+\left(\frac{W_x}{E_x}\right)\ldots+\left(\frac{W_n}{E_n}\right)\right\}} \quad (1)$$

<Method for Measuring Characteristics of Cured Epoxy Resin>

(1) Measurement of Glass Transition Temperature of Cured Epoxy Resin

A plate-shaped cured epoxy resin having a thickness of 2 mm was obtained by defoaming the uncured epoxy resin composition in vacuum and thereafter filling the defoamed epoxy resin composition into a mold in which the thickness of the cavity is set to 2 mm using spacers made of "Teflon (registered trademark)" having a thickness of 2 mm, and curing the filled epoxy resin composition at a temperature of 180° C. for 120 minutes. A test specimen having a width of 12.7 mm and a length of 35.0 mm was cut out from this cured epoxy resin. Using this test specimen, storage elastic modulus was measured using a dynamic viscoelasticity measurement apparatus (DMA-Q800: manufactured by TA Instruments) at the time of temperature rising under conditions of a temperature rise rate of 5° C./min, a frequency of 1 Hz, and a cantilevered bending mode. The onset temperature of the storage elastic modulus in this measurement was determined to be the glass transition temperature of the sample.

(2) Measurement of Flexural Strength and Flexural Modulus of Cured Epoxy Resin at Room Temperature Test specimens having a width of 10 mm and a length of 60 mm were cut out from the cured epoxy resin prepared in (1). Using these test specimens, the flexural strength and the flexural modulus of the cured epoxy resin at room temperature were measured using an Instron universal testing machine (manufactured by Illinois Tool Works Inc.) by carrying out a three-point bending test under conditions of a span of 32 mm and a cross-head speed of 100 mm/minute in accordance with JIS K7171 (1994). The average value of the values obtained by measuring six test pieces was defined as the measured value.

(3) Measurement of Flexural Strength and Flexural Modulus of Cured Epoxy Resin at High Temperature (110° C.)

The test specimens were prepared in the same manner as (2). Using these test specimens, the flexural strength and the flexural modulus of cured epoxy resin at high temperature were measured by carrying out the three-point bending test in the same manner as (2) except that the measurement was carried out after confirming that the temperature of the test specimen was reached to 110° C. using a thermocouple in a thermostatic oven maintained at 110° C. The average value of the values obtained by measuring six test pieces was defined as the measured value.

(4) Evaluation Method of Preservation Stability of Resin Composition

For preservation stability of the uncured resin composition, 2 g of the resin composition was weighed in an aluminum cup and a raised temperature in the glass transition temperature when the resin composition was preserved in an oven of 40° C. for 7 days was measured to determine the preservation stability. For the glass transition temperature, 4 mg of the resin composition after preservation was weighed in a sample pan and measured from −50° C. to 50° C. at a temperature rise rate of 10° C./minute using a differential scanning calorimeter (Q-2000: manufactured by TA Instruments). The midpoint of the inflection point of the obtained calorific curve was acquired as the glass transition temperature. The glass transition temperatures of the resin composition just after preparation and after preservation at 40° C. for 7 days were measured. The preservation stability was evaluated based on the raised temperature between the glass transition temperatures before preservation and after preservation.

Example 1

The epoxy resin composition was prepared in accordance with <Method for preparing epoxy resin composition> by using 35 parts by mass of "TEPIC (registered trademark)"-S, 28 parts by mass of "Araldite (registered trademark)" MY0600, and 37 parts by mass of "EPICLON (registered trademark)" Epc830 as the [A] epoxy resin, 6.9 parts by mass of DICY7 as [B], 10.6 parts by mass of SEIKA-CURE-S as [C], 3 parts by mass of DCMU99 as the [D] accelerator, and 10 parts by mass of Sumika Excel (registered trademark)" PES 5003P as the [E] thermoplastic resin.

The glass transition temperature, the flexural strength and the flexural modulus of the cured epoxy resin at room temperature, the flexural strength and the flexural modulus of the cured epoxy resin at high temperature (110° C.), the raised temperature in the glass transition temperature after preserving the uncured epoxy resin composition at 40° C. for 7 days are as listed in Table 1.

Examples 2 to 21

The epoxy resin compositions and the cured epoxy resins were prepared in the same method as the method in Example 1 except that the components and added amounts of the epoxy resin compositions were changed as listed in Table 1 and Table 2.

For each of the epoxy resin compositions in Examples, the glass transition temperature, the flexural strength and the flexural modulus of the cured epoxy resin at room temperature, the flexural strength and the flexural modulus of the cured epoxy resin at high temperature (110° C.), the raised temperature in the glass transition temperature after preserving the uncured epoxy resin composition at 40° for 7 days are as listed in Table 1 and Table 2.

Comparative Example 1

The epoxy resin composition and the cured epoxy resin were prepared in the same method as the method in Example 1 using the components listed in Comparative Example 1 in Table 3. In Comparative Example 1, the component [A1] was not added and the average epoxy equivalent of the [A] epoxy resin is higher than 150 g/eq and thus the cured epoxy resin had lower flexural strength and flexural modulus at high temperature.

Comparative Example 2

The epoxy resin composition and the cured epoxy resin were prepared in the same method as the method in Example 1 using the components listed in Comparative Example 2 in Table 3. In Comparative Example 2, the component [A1] was not added and thus the cured epoxy resin had lower flexural strength and flexural modulus at high temperature.

Comparative Example 3

The epoxy resin composition and the cured epoxy resin were prepared in the same method as the method in Example 1 using the components listed in Comparative Example 3 in Table 3. In Comparative Example 3, the component [A1]

was not added and thus the cured resin had lower flexural strength and flexural modulus at high temperature.

Comparative Example 4

The epoxy resin composition and the cured epoxy resin were prepared in the same method as the method in Example 1 using the components listed in Comparative Example 4 in Table 3. In Comparative Example 4, the component [A1] was not added and thus the cured resin had lower flexural strength and flexural modulus at high temperature.

Comparative Example 5

The epoxy resin composition and the cured epoxy resin were prepared in the same method as the method in Example 1 using the components listed in Comparative Example 5 in Table 3. In Comparative Example 5, the component [A1] was not added and thus the cured epoxy resin had lower flexural strength and flexural modulus at high temperature.

Comparative Example 6

The epoxy resin composition and the cured epoxy resin were prepared in the same method as the method in Example 1 using the components listed in Comparative Example 6 in Table 3. In Comparative Example 6, the component [A2] was not added and thus the cured epoxy resin had lower glass transition temperature.

Comparative Example 7

The epoxy resin composition and the cured epoxy resin were prepared in the same method as the method in Example 1 using the components listed in Comparative Example 7 in Table 3. In Comparative Example 7, the component [C] was not added and thus the cured epoxy resin had lower glass transition temperature.

Comparative Example 8

The epoxy resin composition and the cured epoxy resin were prepared in the same method as the method in Example 1 using the components listed in Comparative Example 8 in Table 3. In Comparative Example 8, the component [C] was added in an amount of more than 0.3 equivalent and thus the uncured epoxy resin composition had lower preservation stability.

Comparative Example 9

The epoxy resin composition and the cured epoxy resin were prepared in the same method as the method in Example 1 using the components listed in Comparative Example 9 in Table 3. In Comparative Example 9, the average epoxy equivalent of the [A] epoxy resin was lower than 115 g/eq and thus the reaction at the time of curing was rather uncontrollable. This resulted in providing the cured epoxy resin having lower strength.

Comparative Example 10

The epoxy resin composition and the cured epoxy resin were prepared in the same method as the method in Example 1 using the components listed in Comparative Example 10 in Table 3. In Comparative Example 10; the average epoxy equivalent of the [A] epoxy resin is higher than 150 g/eq and the distance between crosslinking points was increased. This resulted in providing the cured epoxy resin having lower elastic modulus.

TABLE 1

| | | | Trade name | Epoxy equivalent (g/eq) | Example 1 | Example 2 | Example 3 | Example 4 | Example 5 | Example 6 |
|---|---|---|---|---|---|---|---|---|---|---|
| Epoxy resin composition (part by mass) | [A] Epoxy resin | [A1] Isocyanurate epoxy resin | "TEPIC ®"-S | 100 | 35 | 32 | 32 | | 35 | 35 |
| | | | "TEPIC ®"-VL | 135 | | | | 30 | | |
| | | [A2] Glycidyl amine epoxy resin | "Araldite ®" MY0600 | 118 | 28 | 15 | | 40 | 28 | 28 |
| | | | "SUMI-EPOXY ®" ELM434 | 120 | | 16 | 30 | | | |
| | | [A3] Bisphenol epoxy resin | "EPICLON ®" Epc830 | 172 | 37 | 37 | 38 | 30 | 37 | 37 |
| | | | "jER ®" 828 | 189 | | | | | | |
| | | | "jER ®" 1001 | 475 | | | | | | |
| | | Other epoxy resin | "jER ®" 154 | 175 | | | | | | |
| | | | "EPICLON ®" HP-4700 | 164 | | | | | | |
| | | | "jER ®" YX-4000 | 192 | | | | | | |
| | [B] Dicyandiamide | | DICY7 | — | 6.9 | 6.8 | 6.6 | 6.4 | 6.9 | 6.9 |
| | [C] Diaminodiphenyl sulfone | | SEIKACURE-S | — | 10.6 | 10.3 | 10.1 | | 13.2 | 5.3 |
| | | | 3,3'-DAS | — | | | | 7.4 | | |
| | [D] Accelerator | | DCMU99 | — | 3 | 3 | 3 | 3 | 3 | 3 |
| | [E] Thermoplastic resin | | "Sumika Excel ®" PES 5003P | — | 10 | 10 | 15 | 12 | 10 | 10 |
| | | | "Vinylec ®" K | — | | | | | | |
| Characteristics of epoxy resin composition | Average epoxy equivalent of [A] epoxy resin (g/eq) | | | | 125 | 126 | 126 | 136 | 125 | 125 |
| | Amount of component [C] added (active hydrogen group equivalents relative to epoxy groups in [A]) | | | | 0.20 | 0.20 | 0.20 | 0.15 | 0.25 | 0.10 |
| | Glass transition temperature of cured product (° C.) | | | | 199 | 199 | 198 | 196 | 202 | 190 |
| | Flexural strength of cured product at room temperature (MPa) | | | | 162 | 161 | 160 | 165 | 155 | 155 |

TABLE 1-continued

|  |  |  |  |  |  |  |  |
|---|---|---|---|---|---|---|---|
| Flexural modulus of cured product at room temperature (GPa) | 4.5 | 4.4 | 4.4 | 4.3 | 4.5 | 4.5 |
| Flexural strength of cured product at high temperature (110° C.) (MPa) | 143 | 144 | 142 | 139 | 145 | 135 |
| Flexural modulus of cured product at high temperature (110° C.) (GPa) | 3.7 | 3.6 | 3.6 | 3.4 | 3.7 | 3.6 |
| Raised temperature of glass transition temperature when uncured resin composition is preserved at 40° C. for 7 days | 1 | 1 | 1 | 5 | 6 | 0 |

|  |  |  | Trade name | Epoxy equivalent (g/eq) | Example 7 | Example 8 | Example 9 | Example 10 |
|---|---|---|---|---|---|---|---|---|
| Epoxy resin composition (part by mass) | [A] Epoxy resin | [A1] Isocyanurate epoxy resin | "TEPIC ®"-S | 100 | 35 | 35 | 30 | 20 |
|  |  |  | "TEPIC ®"-VL | 135 |  |  |  |  |
|  |  | [A2] Glycidyl amine epoxy resin | "Araldite ®" MY0600 | 118 | 15 | 5 | 45 | 55 |
|  |  |  | "SUMI-EPOXY ®" ELM434 | 120 |  |  |  |  |
|  |  | [A3] Bisphenol epoxy resin | "EPICLON ®" Epc830 | 172 | 50 | 60 | 25 | 25 |
|  |  |  | "jER ®" 828 | 189 |  |  |  |  |
|  |  |  | "jER ®" 1001 | 475 |  |  |  |  |
|  |  | Other epoxy resin | "jER ®" 154 | 175 |  |  |  |  |
|  |  |  | "EPICLON ®" HP-4700 | 164 |  |  |  |  |
|  |  |  | "jER ®" YX-4000 | 192 |  |  |  |  |
|  | [B] Dicyandiamide |  | DICY7 | — | 6.5 | 6.3 | 7.2 | 7.2 |
|  | [C] Diaminodiphenyl sulfone |  | SEIKACURE-S | — | 10.0 | 9.5 | 11.0 | 10.9 |
|  |  |  | 3,3'-DAS | — |  |  |  |  |
|  | [D] Accelerator |  | DCMU99 | — | 3 | 3 | 3 | 3 |
|  | [E] Thermoplastic resin |  | "Sumika Excel ®" PES 5003P | — | 10 | 10 | 10 | 10 |
|  |  |  | "Vinylec ®" K | — |  |  |  |  |
| Characteristics of epoxy resin composition | Average epoxy equivalent of [A] (g/eq) |  |  |  | 130 | 135 | 121 | 123 |
|  | Amount of component [C] added (active hydrogen group equivalents relative to epoxy groups in [A]) |  |  |  | 0.20 | 0.20 | 0.20 | 0.20 |
|  | Glass transition temperature of cured product (° C.) |  |  |  | 190 | 185 | 203 | 208 |
|  | Flexural strength of cured product at room temperature (MPa) |  |  |  | 165 | 167 | 157 | 155 |
|  | Flexural modulus of cured product at room temperature (GPa) |  |  |  | 4.3 | 4.2 | 4.6 | 4.6 |
|  | Flexural strength of cured product at high temperature (110° C.) (MPa) |  |  |  | 138 | 131 | 136 | 134 |
|  | Flexural modulus of cured product at high temperature (110° C.) (GPa) |  |  |  | 3.5 | 3.4 | 3.8 | 3.8 |
|  | Raised temperature of glass transition temperature when uncured resin composition is preserved at 40° C. for 7 days |  |  |  | 2 | 2 | 1 | 1 |

TABLE 2

|  |  |  | Trade name | Epoxy equivalent (g/eq) | Example 11 | Example 12 | Example 13 | Example 14 | Example 15 | Example 16 |
|---|---|---|---|---|---|---|---|---|---|---|
| Epoxy resin composition (part by mass) | [A] Epoxy resin | [A1] Isocyanurate epoxy resin | "TEPIC ®"-S | 100 | 25 | 15 | 38 | 45 | 20 | 33 |
|  |  |  | "TEPIC ®"-VL | 135 |  |  |  |  |  |  |
|  |  | [A2] Glycidyl amine epoxy resin | "Araldite ®" MY0600 | 118 |  |  |  |  | 17 |  |
|  |  |  | "SUMI-EPOXY ®" ELM434 | 120 | 35 | 40 | 32 | 30 |  | 32 |
|  |  | [A3] Bisphenol epoxy resin | "EPICLON ®" Epc830 | 172 | 40 | 45 | 30 | 25 |  | 63 |
|  |  |  | "jER ®" 828 | 189 |  |  |  |  |  |  |
|  |  |  | "jER ®" 1001 | 475 |  |  |  |  |  |  |
|  |  | Other epoxy resin | "jER ®" 154 | 175 |  |  |  |  |  | 35 |
|  |  |  | "EPICLON ®" HP-4700 | 164 |  |  |  |  |  |  |
|  |  |  | "jER ®" YX-4000 | 192 |  |  |  |  |  |  |

TABLE 2-continued

| | | Trade name | | | | | | | |
|---|---|---|---|---|---|---|---|---|---|
| | [B] Dicyandiamide | DICY7 | — | 6.5 | 6.3 | 6.9 | 7.1 | 6.0 | 6.7 |
| | [C] Diaminodiphenyl sulfone | SEIKACURE-S 3,3'-DAS | — | 9.9 | 9.5 | 10.5 | 10.8 | 9.1 | 10.2 |
| | [D] Accelerator | DCMU99 | — | 3 | 3 | 3 | 3 | 3 | 3 |
| | [E] Thermoplastic resin | "Sumika Excel ®" PES 5003P | — | 15 | 15 | 15 | 15 | 12 | 5 |
| | | "Vinylec ®" K | — | | | | | | |
| Characteristics of epoxy resin composition | Average epoxy equivalent of [A] epoxy resin (g/eq) | | | 129 | 134 | 122 | 118 | 141 | 126 |
| | Amount of component [C] added (active hydrogen group equivalents relative to epoxy groups in [A]) | | | 0.20 | 0.20 | 0.20 | 0.20 | 0.20 | 0.20 |
| | Glass transition temperature of cured product (° C.) | | | 199 | 201 | 192 | 185 | 185 | 194 |
| | Flexural strength of cured product at room temperature (MPa) | | | 159 | 156 | 158 | 154 | 159 | 152 |
| | Flexural modulus of cured product at room temperature (GPa) | | | 4.2 | 4.1 | 4.5 | 4.5 | 3.9 | 4.1 |
| | Flexural strength of cured product at high temperature (110° C.) (MPa) | | | 135 | 130 | 137 | 130 | 133 | 131 |
| | Flexural modulus of cured product at high temperature (110° C.) (GPa) | | | 3.4 | 3.1 | 3.7 | 3.7 | 3.1 | 3.4 |
| | Raised temperature of glass transition temperature when uncured resin composition is preserved at 40° C. for 7 days | | | 1 | 1 | 1 | 1 | 5 | 2 |

| | | | Trade name | Epoxy equivalent (g/eq) | Example 17 | Example 18 | Example 19 | Example 20 | Example 21 |
|---|---|---|---|---|---|---|---|---|---|
| Epoxy resin composition (part by mass) | [A] Epoxy resin | [A1] Isocyanurate epoxy resin | "TEPIC ®"-S | 100 | 35 | 25 | 33 | 25 | 32 |
| | | | "TEPIC ®"-VL | 135 | | | | | |
| | | [A2] Glycidyl amine epoxy resin | "Araldite ®" MY0600 | 118 | 28 | | | 35 | |
| | | | "SUMI-EPOXY ®" ELM434 | 120 | | 35 | 32 | | 30 |
| | | [A3] Bisphenol epoxy resin | "EPICLON ®" Epc830 | 172 | 17 | 20 | | 40 | 38 |
| | | | "jER ®" 828 | 189 | | | 35 | | |
| | | | "jER ®" 1001 | 475 | | | | | |
| | | Other epoxy resin | "jER ®" 154 | 175 | | | | | |
| | | | "EPICLON ®" HP-4700 | 164 | 20 | | | | |
| | | | "jER ®" YX-4000 | 192 | | 20 | | | |
| | [B] Dicyandiamide | | DICY7 | — | 7.0 | 6.4 | 6.6 | 6.8 | 6.6 |
| | [C] Diaminodiphenyl sulfone | | SEIKACURE-S 3,3'-DAS | — | 10.6 | 9.8 | 10.0 | 10.3 | 10.1 |
| | [D] Accelerator | | DCMU99 | — | 3 | 3 | 3 | 0 | 3 |
| | [E] Thermoplastic resin | | "Sumika Excel ®" PES 5003P | — | 13 | 10 | 15 | 10 | |
| | | | "Vinylec ®" K | — | | | | | 5 |
| Characteristics of epoxy resin composition | Average epoxy equivalent of [A] epoxy resin (g/eq) | | | | 120 | 131 | 128 | 124 | 126 |
| | Amount of component [C] added (active hydrogen group equivalents relative to epoxy groups in [A]) | | | | 0.20 | 0.20 | 0.20 | 0.20 | 0.20 |
| | Glass transition temperature of cured product (° C.) | | | | 197 | 195 | 200 | 188 | 186 |
| | Flexural strength of cured product at room temperature (MPa) | | | | 155 | 156 | 160 | 159 | 159 |
| | Flexural modulus of cured product at room temperature (GPa) | | | | 4.4 | 4 | 4 | 4.3 | 4.1 |
| | Flexural strength of cured product at high temperature (110° C.) (MPa) | | | | 133 | 136 | 130 | 134 | 130 |
| | Flexural modulus of cured product at high temperature (110° C.) (GPa) | | | | 3.5 | 3.2 | 3.3 | 3.5 | 3.1 |
| | Raised temperature of glass transition temperature when uncured resin composition is preserved at 40° C. for 7 days | | | | 3 | 2 | 1 | 2 | 1 |

TABLE 3

| | | | Trade name | Epoxy equivalent (g/eq) | Comparative Example 1 | Comparative Example 2 | Comparative Example 3 | Comparative Example 4 | Comparative Example 5 |
|---|---|---|---|---|---|---|---|---|---|
| Epoxy resin composition (part by mass) | [A] Epoxy resin | [A1] Isocyanurate epoxy resin | "TEPIC ®"-S | 100 | | | | | |
| | | | "TEPIC ®"-VL | 135 | | | | | |
| | | [A2] Glycidyl amine epoxy resin | "Araldite ®" MY0600 | 118 | | | | 45 | |
| | | | "SUMI-EPOXY ®" ELM434 | 120 | 35 | 80 | | 45 | 50 |
| | | [A3] Bisphenol | "EPICLON ®" Epc830 | 172 | | | 35 | 35 | 50 |

TABLE 3-continued

|  |  |  | Epoxy equivalent (g/eq) |  |  |  |  |  |
|---|---|---|---|---|---|---|---|---|
|  | epoxy resin | "jER®" 828 | 189 | 40 | 20 |  |  |  |
|  |  | "jER®" 1001 | 475 | 25 |  |  |  |  |
|  | Other epoxy resin | "jER®" 154 | 175 |  |  |  |  |  |
|  |  | "EPICLON®" HP-4700 | 164 |  |  | 20 |  |  |
|  |  | "jER®" YX-4000 | 192 |  |  |  | 20 |  |
| [B] Dicyandiamide |  | DICY7 | — | 5.0 | 4.0 | 5.9 | 5.7 | 5.9 |
| [C] Diaminodiphenyl sulfone |  | SEIKACURE-S 3,3'-DAS | — | 3.2 | 8.4 | 9.0 | 8.7 | 9.1 |
| [D] Accelerator |  | DCMU99 | — | 3 | 4 | 3 | 3 | 3 |
| [E] Thermoplastic resin |  | "Sumika Excel®" PES 5003P | — |  | 5 | 5 | 5 | 15 |
|  |  | "Vinylec®" K | — | 4 |  |  |  |  |
| Characteristics of epoxy resin composition | Average epoxy equivalent of [A] epoxy resin (g/eq) |  |  | 180 | 129 | 135 | 146 | 141 |
|  | Amount of component [C] added (active hydrogen group equivalents relative to epoxy groups in [A]) |  |  | 0.09 | 0.17 | 0.20 | 0.20 | 0.20 |
|  | Glass transition temperature of cured product (° C.) |  |  | 175 | 208 | 194 | 193 | 205 |
|  | Flexural strength of cured product at room temperature (MPa) |  |  | 159 | 168 | 152 | 154 | 152 |
|  | Flexural modulus of cured product at room temperature (GPa) |  |  | 3.4 | 3.7 | 4.1 | 3.7 | 4 |
|  | Flexural strength of cured product at high temperature (110° C.) (MPa) |  |  | 115 | 126 | 129 | 131 | 123 |
|  | Flexural modulus of cured product at high temperature (110° C.) (GPa) |  |  | 2.6 | 2.9 | 2.9 | 2.7 | 2.9 |
|  | Raised temperature of glass transition temperature when uncured resin composition is preserved at 40° C. for 7 days |  |  | 7 | 12 | 14 | 12 | 11 |

|  |  |  |  | Trade name | Epoxy equivalent (g/eq) | Comparative Example 6 | Comparative Example 7 | Comparative Example 8 | Comparative Example 9 | Comparative Example 10 |
|---|---|---|---|---|---|---|---|---|---|---|
| Epoxy resin composition (part by mass) | [A] Epoxy resin | [A1] Isocyanurate epoxy resin |  | "TEPIC®"-S | 100 | 30 | 35 | 35 | 40 | 20 |
|  |  |  |  | "TEPIC®"-VL | 135 |  |  |  |  |  |
|  |  | [A2] Glycidyl amine epoxy resin |  | "Araldite®" MY0600 | 118 |  | 28 | 28 | 50 |  |
|  |  |  |  | "SUMI-EPOXY®" ELM434 | 120 |  |  |  |  | 35 |
|  |  | [A3] Bisphenol epoxy resin |  | "EPICLON®" Epc830 | 172 | 70 | 37 | 37 | 10 | 8 |
|  |  |  |  | "jER®" 828 | 189 |  |  |  |  |  |
|  |  |  |  | "jER®" 1001 | 475 |  |  |  |  | 37 |
|  |  | Other epoxy resin |  | "jER®" 154 | 175 |  |  |  |  |  |
|  |  |  |  | "EPICLON®" HP-4700 | 164 |  |  |  |  |  |
|  |  |  |  | "jER®" YX-4000 | 192 |  |  |  |  |  |
| [B] Dicyandiamide |  |  |  | DICY7 | — | 5.9 | 6.7 | 6.7 | 7.4 | 5.2 |
| [C] Diaminodiphenyl sulfone |  |  |  | SEIKACURE-S 3,3'-DAS | — | 9.0 |  | 20.5 | 11.3 | 7.9 |
| [D] Accelerator |  |  |  | DCMU99 | — | 3 | 3 | 2 | 3 | 3 |
| [E] Thermoplastic resin |  |  |  | "Sumika Excel®" PES 5003P | — | 10 | 10 | 10 | 7 | 10 |
|  |  |  |  | "Vinylec®" K | — |  |  |  |  |  |
| Characteristics of epoxy resin composition | Average epoxy equivalent of [A] epoxy resin (g/eq) |  |  |  |  | 141 | 121 | 121 | 113 | 162 |
|  | Amount of component [C] added (active hydrogen group equivalents relative to epoxy groups in [A]) |  |  |  |  | 0.20 | 0.00 | 0.40 | 0.20 | 0.20 |
|  | Glass transition temperature of cured product (° C.) |  |  |  |  | 171 | 178 | 206 | 201 | 184 |
|  | Flexural strength of cured product at room temperature (MPa) |  |  |  |  | 165 | 151 | 135 | 136 | 155 |
|  | Flexural modulus of cured product at room temperature (GPa) |  |  |  |  | 4.1 | 4.6 | 4.4 | 4.5 | 3.8 |
|  | Flexural strength of cured product at high temperature (110° C.) (MPa) |  |  |  |  | 134 | 123 | 122 | 118 | 114 |
|  | Flexural modulus of cured product at high temperature (110° C.) (GPa) |  |  |  |  | 3.1 | 3.4 | 3.7 | 3.4 | 2.6 |
|  | Raised temperature of glass transition temperature when uncured resin composition is preserved at 40° C. for 7 days |  |  |  |  | 7 | 0 | 21 | 2 | 0 |

The epoxy resin composition of the present invention provides the cured epoxy resin having high mechanical properties of material at high temperature and thus the fiber reinforced material using the epoxy resin composition has high heat resistance. For using the fiber reinforced material in industrial material applications, expanded applicability for various applications such as parts around the engines of automobiles and the rims of bicycles is expected due to expansion of types of environments where the fiber reinforced material can be used.

The invention claimed is:

1. An epoxy resin composition comprising:

[A] an epoxy resin component comprising at least [A1] an isocyanurate epoxy resin and [A2] one or more glycidyl amine epoxy resins other than an isocyanurate epoxy resin;

[B] dicyandiamide; and
[C] diaminodiphenyl sulfone, wherein:
(1) [A] has an average epoxy equivalent of 115 g/eq to 150 g/eq;
(2) [C] is present in an amount of 0.05 equivalent to 0.3 equivalent relative to epoxy groups in [A], in terms of active hydrogen groups;
(3) [A1] is present in an amount of 20 parts by mass to 40 parts by mass per 100 parts by mass of [A];
(4) [A2] is present in an amount of 10 parts by mass to 50 parts by mass per 100 parts by mass of [A]; and
(5) [A1] and [A2] are present in a total amount of 40 parts by mass to 90 parts by mass per 100 parts by mass of [A].

2. The epoxy resin composition according to claim 1, wherein [A2] is one or more glycidyl amine epoxy resins having at least a tri-functionality, other than an isocyanurate epoxy resin.

3. The epoxy resin composition according to claim 1, wherein [A] further comprises 20 parts by mass to 60 parts by mass per 100 parts by mass of [A] of [A3] a bisphenol epoxy resin.

4. The epoxy resin composition according to claim 3, wherein [A3] is a bisphenol F epoxy resin.

5. The epoxy resin composition according to claim 1, further comprising [D] an accelerator.

6. The epoxy resin composition according to claim 5, wherein [D] is a urea compound.

7. The epoxy resin composition according to claim 1, further comprising [E] a thermoplastic resin.

8. The epoxy resin composition according to claim 7, wherein [E] is a polyethersulfone resin.

9. The epoxy resin composition of claim 1, wherein [A2] is selected from the group consisting of diaminodiphenylmethane epoxy resins, aminophenol epoxy resins, diaminodiphenyl sulfone epoxy resins, and combinations thereof.

10. A prepreg formed by impregnating the epoxy resin composition according to claim 1 into reinforcement fibers.

11. The prepreg according to claim 10, wherein the reinforcement fibers are carbon fibers.

12. A fiber reinforced material formed by curing the prepreg according to claim 10.

13. An epoxy resin composition comprising:
[A] an epoxy resin component comprising at least [A1] an isocyanurate epoxy resin, [A2] one or more glycidyl amine epoxy resins other than an isocyanurate epoxy resin, and [A3] a bisphenol epoxy resin, wherein [A3] is present in an amount of 20 parts by mass to 60 parts by mass per 100 parts by mass of [A];
[B] dicyandiamide; and
[C] diaminodiphenyl sulfone, wherein:
(1) [A] has an average epoxy equivalent of 115 g/eq to 150 g/eq; and
(2) [C] is present in an amount of 0.05 equivalent to 0.3 equivalent relative to epoxy groups in [A], in terms of active hydrogen groups.

14. The epoxy resin composition according to claim 13, wherein [A3] is a bisphenol F epoxy resin.

* * * * *